(12) United States Patent
Karlberg et al.

(10) Patent No.: US 12,399,895 B2
(45) Date of Patent: Aug. 26, 2025

(54) SYSTEM AND METHOD OF PRIVACY-PRESERVATION IN CACHING OF GRAPH QUERY EXECUTION PLANS

(71) Applicant: Microsoft Technology Licensing, LLC, Redmond, WA (US)

(72) Inventors: Jan-Ove Almli Karlberg, Tromsø (NO); Viola Lisa Viktoria Jonsson, Tromsø (NO); Tor Kreutzer, Harstad (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/414,197

(22) Filed: Jan. 16, 2024

(65) Prior Publication Data

US 2025/0231937 A1    Jul. 17, 2025

(51) Int. Cl.
*G06F 16/00* (2019.01)
*G06F 16/2453* (2019.01)
*G06F 21/62* (2013.01)

(52) U.S. Cl.
CPC .. *G06F 16/24539* (2019.01); *G06F 16/24542* (2019.01); *G06F 21/6227* (2013.01)

(58) Field of Classification Search
None
See application file for complete search history.

(56) References Cited

U.S. PATENT DOCUMENTS

| | | | |
|---|---|---|---|
| 6,356,887 B1 | 3/2002 | Berenson | |
| 6,466,931 B1 | 10/2002 | Attaluri | |
| 9,280,583 B2* | 3/2016 | Duan | G06F 16/24545 |
| 10,496,644 B2* | 12/2019 | Chamieh | G06F 16/9024 |
| 10,831,753 B2* | 11/2020 | Chamieh | G06F 16/24542 |
| 2006/0224563 A1* | 10/2006 | Hanson | G06F 16/24542 |
| 2019/0179752 A1* | 6/2019 | Yoo | G06F 12/0891 |
| 2020/0265090 A1* | 8/2020 | Hilloulin | G06F 16/9024 |
| 2020/0409955 A1* | 12/2020 | Tokarev Sela | G06F 16/24578 |
| 2022/0245150 A1* | 8/2022 | Delbru | G06F 16/24544 |

(Continued)

OTHER PUBLICATIONS

Apollo Graph Inc., "Caching in Apollo Client," Retrieved from https://www.apollographql.com/docs/react/caching/overview/, Sep. 22, 2021, 8 pages.

(Continued)

*Primary Examiner* — Farhan M Syed
(74) *Attorney, Agent, or Firm* — NovoTechIP International PLLC

(57) ABSTRACT

A method is provided for caching a query submitted to a graph data storage system, including receiving a query from a query caller directed to the graph data storage system, and examining the query, via a cache suitability determination engine, to determine if the query is suitable for caching under a first graph query caching policy based on the query caller being a trusted caller and/or the query scenario being a trusted query scenario. If suitable, generating a query execution plan for the query via a graph query plan generating engine and examining the query plan to determine if the query plan is suitable for caching under the first policy. If not suitable, caching the query under a second or a third graph caching policy based on the geographic location of a memory system on which the query plan is stored, and providing the query execution plan.

16 Claims, 6 Drawing Sheets

(56) References Cited

U.S. PATENT DOCUMENTS

2024/0394097 A1\* 11/2024 Dash .................... G06F 9/5022

OTHER PUBLICATIONS

Chatzopoulos, et al., "Atrapos: Real-time Evaluation of Metapath Query Workloads", Proceedings of the ACM Web Conference 2023, Apr. 30, 2023, pp. 2487-2498.
Extended European search report received for European Application No. 25150383.5, mailed on May 23, 2025, 10 pages.
Müller, et al., "Aggregates Caching in Columnar In-Memory Databases", Memory Data Management and Analysis, Jan. 14, 2015, pp. 69-81.

\* cited by examiner

SYSTEM AND METHOD OF PRIVACY-PRESERVATION IN CACHING OF GRAPH QUERY EXECUTION PLANS

BACKGROUND

Some large software companies make use of a graph storage data infrastructure to store various types of data for and/or about their customers. Graph data may be stored in a plethora of different physical storage systems and is often only semantically connected. While the data is stored in a variety of different storage systems, the graph environment provides a coherent single data infrastructure that can be accessed for retrieving many different types of data. The data stored in the graph storage data environment may include confidential, private or otherwise sensitive customer data. Various customers or services receive access to the graph data by making queries to the graph storage data environment. This is often done through a graph query application programming interface (API) that enables various customers or services to submit a query to the graph environment for access to the data stored in the graph storage data infrastructure.

Upon receiving a graph query through the API, a graph query execution framework functions by determining what data is requested, identifying which of the physical storage systems are candidates for retrieving this data, and then generating an optimized query plan that takes various constraints such as cost, latency, reliability and the like into consideration for executing the query. The process of generating an optimized query plan, however, is a resource expensive process. For example, considerable amount of memory storage and processing resources are needed to generate each query plan. Given the large number of queries received for a typical graph environment, generating query plans results in a significant use of computing resources in the graph data environment. Furthermore, the process of generating an optimal query plan increases latency in processing queries. For example, generating an optimal query plan can sometimes take 10's of milliseconds which can significantly affect latency in processing large number of queries.

To alleviate both resource consumption and latency issues, some query processing systems cache and reuse query plans. By re-using previously compiled and cached query plans, computing resource use can be significantly reduced, thus reducing the cost of services and improving scalability. Caching and reusing query plans could also improve latency in the processing of queries. However, queries that are issued against a graph environment cannot be simply cached as many queries to the graph environment include sensitive and/or confidential data. There are many privacy and confidentiality considerations and restrictions against storing sensitive data, and the process of identifying the sensitive and confidential data in queries is computationally complex and resource intensive.

Hence, there is a need for improved systems and methods of caching graph query execution plans.

SUMMARY

In one general aspect, the instant disclosure describes a data processing system having a processor and a memory in communication with the processor, where the memory comprises executable instructions that, when executed by the processor alone or in combination with other elements, cause the data processing system to perform multiple functions. These functions include receiving a query for data stored in a graph data storage system, the query being received from a query caller via an application programming interface; determining, via a cache suitability determination engine, that the query is suitable for caching under a first graph query caching policy based on at least one of the query caller being a trusted caller or a query scenario being a trusted query scenario; upon determining that the query is suitable for caching under the first graph query caching policy, generating a query execution plan for the query via a graph query plan generating engine; examining the query execution plan to verify that the query is suitable for caching under the first graph query caching policy; upon verifying that the query is suitable for caching under the first graph query caching policy, caching the query execution plan; upon verifying that the query is not suitable for caching under the first graph query caching policy, caching the query under a second graph query caching policy; and providing the query execution plan for execution.

In another general aspect the instant disclosure describes a method for caching a query submitted to a graph data storage system. The method includes receiving a query directed to the graph data storage system, the query being received from a query caller via an application programming interface; examining the query, via a cache suitability determination engine, to determine if the query is suitable for caching under a first graph query caching policy based on at least one of the query caller being a trusted caller or a query scenario being a trusted query scenario; upon determining that the query is suitable for caching under the first graph query caching policy, generating a query execution plan for the query via a graph query plan generating engine; examining the query execution plan to determine if the query execution plan is suitable for caching under the first graph query caching policy; upon determining that the query execution plan is not suitable for caching under the first graph query caching policy, caching the query under a second graph query caching policy; and providing the query execution plan for execution.

In yet another general aspect, the instant disclosure describes a non-transitory computer readable medium on which are stored instructions that when executed cause a programmable device to perform functions of receiving a query directed to a graph data storage system, the query being received from a query caller via an application programming interface; examining the query, via a cache suitability determination engine, to determine if the query is suitable for caching under a first graph query caching policy based on at least one of the query caller being a trusted caller or a query scenario being a trusted query scenario; upon determining that the query is not suitable for caching under the first graph query caching policy, determining if the query is suitable for caching under a second graph query caching policy; upon determining that the query is not suitable for caching under the second graph query caching policy, determining if the query is suitable for caching under a third graph query caching policy, the third graph query caching policy being based on geographic location of a memory system on which a query execution plan for the query is stored and a limitation on an amount of time for which the query execution plan is stored; upon determining that the query execution plan is suitable for caching under the third graph query caching policy, generating a query execution plan for the query via a graph query plan generating engine; caching the query execution plan in the memory system for an allowed amount of time; and providing the query execution plan for execution.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
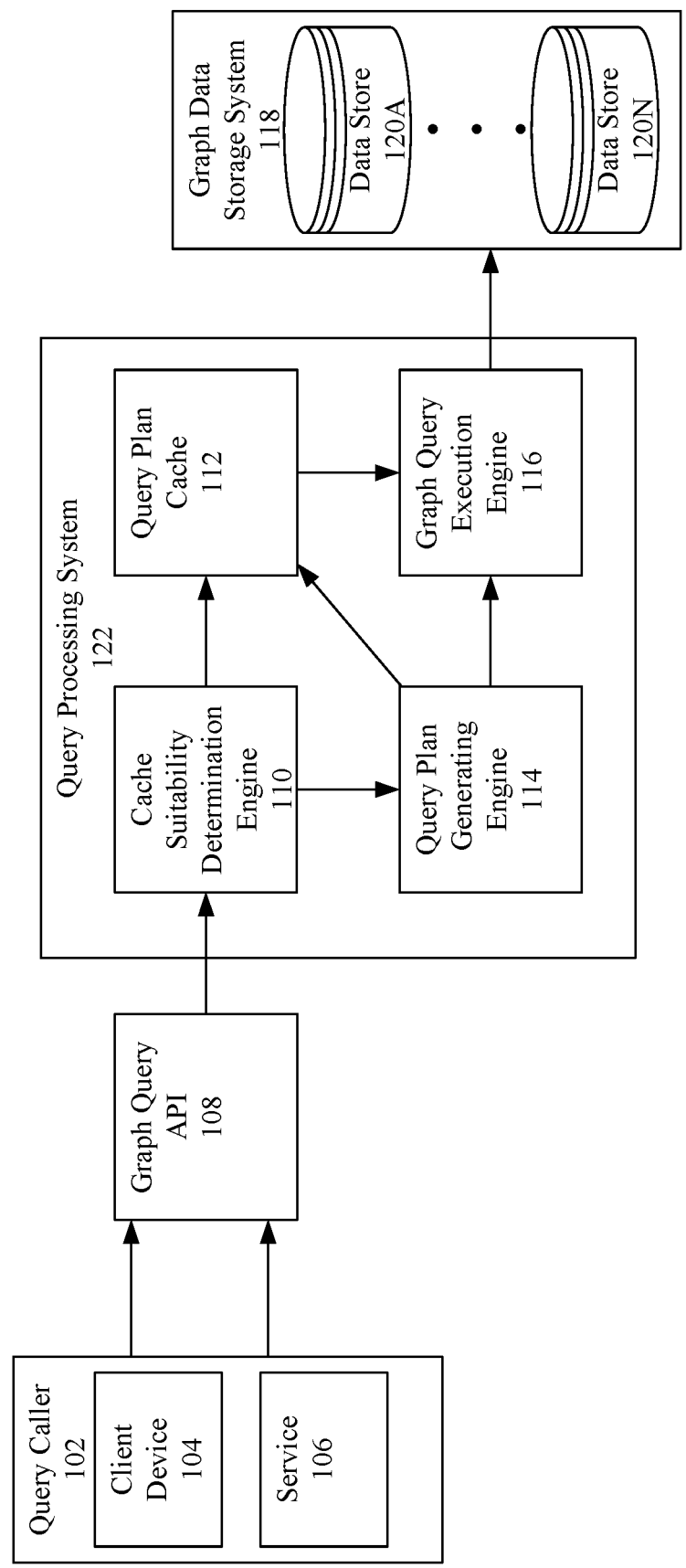
FIG. 1 illustrates an example system upon which aspects of this disclosure may be implemented.

Companies that offer cloud data storage and/or software applications often make use of a cohesive graph data infrastructure to store various types of data in a variety of physical data storage systems. Users and services can access the data by submitting a query to the graph data infrastructure. To ensure efficiency in processing the query, an optimized query execution plan is then generated and used to execute the query against the data and retrieve the required results. The process of generating an optimized query execution plan, however, is resource intensive and time consuming. In large data environments, where thousands or millions of queries are processed in a given time period, generating query execution plans for each received query results in significant use of computing resources and adds substantial latency to the processing of queries. Thus, there exists a technical problem of inefficiency of current graph data infrastructures in generating query execution plans.

A simple approach to reducing computing resources used to process incoming queries would be to cache and reuse query execution plans. However, caching every query plan results in a significant amount of duplicated data. For example, there may be many instances in which two users execute the same query but there is a difference in the query because of some variable such as the user identifications. An example is illustrated in the below queries issued by users Alice and Bob.

MATCH (user)-[:MODIFIED]→(doc:Document) WHERE user.Id='Alice'
MATCH (user)-[:MODIFIED]→(doc:Document) WHERE user.Id='Bob'

The query plan for these two queries is likely exactly the same, because the user must be located using the Id property, before following the MODIFIED edge to the documents that the user has modified. However, since the queries are different at the input level because of the different user Ids, a simplified mechanism of caching every query would end up caching these as individual items. In a system with hundreds of millions of active users, this duplication would result in significant misuse of memory.

Another technical problem with such an approach is the inability to reuse the compiled query plans efficiently. Referring to the above example, if all users have their queries cached individually, the only situation where reuse is possible is when the same user executes the same query repeatedly. While this can occur, it happens a lot less often than different users making the same query. As a result, caching the queries results in significant use of memory, but does not result in significant reduction in computing resources required to process queries.

Moreover, in a graph data environment, where customer data is stored, there is a significant likelihood of sensitive data being included in the query and as a result in the query execution plan. Software providers such as Microsoft® are required to ensure that their computing platforms have mechanisms for safeguarding data security and privacy. This often involves compliance with certain data privacy rules, regulations and policies. For example, some governments and/or other entities have specific rules regarding storage of data. The rules that govern storage of data may also determine how the context in which data is used can impact whether a specific data can be stored in a particular way. In addition to restrictions that originate from laws and regulations, companies that store data such as query data often have contractual obligations to their customers to keep their data safe and secure. For example, some enterprises provide a Customer Key product that enables the customer to manage their own encryption keys for a fee. To ensure compliance with these governmental regulations and contractual obligations, organizations that store or transfer data are required to ensure the safety and security of specific types of data.

Different types of data have different sensitivity levels. For example, personal information is often highly confidential. To determine the sensitivity level, each piece of data is often associated with a specific data classification category. Example data classification categories include System Metadata, End User Pseudonymous Information (EUPI), and Customer Content (CC). Generally, system metadata can be stored and utilized without many restrictions, EUPI data has more restrictions. CC data is often governed by the strictest rules. In addition to different sensitivity levels, the duration for which data is being handled/stored impacts which obligations must be met, and which regulations need to be followed. For example, if something is stored for a sufficiently long time, it is considered to be at rest, and encryption may need to be applied for certain classes of data that are stored for a sufficiently long time. Thus, not all graph query plans can be cached and reused and determining which query plans can be cached can depend on a number of factors, which itself can become a complex and computationally resource intensive process. Thus, there exists another technical problem of determining how and when to cache a graph query execution plan without significant increase in use of computing resources and without increasing latency.

To address these technical problems and more, in an example, this description provides a technical solution for caching graph query execution plans in a manner that is efficient and ensures data privacy. This involves use of a system architecture that includes a cache suitability determination engine and a query plan generation engine. The cache suitability determination engine determines quickly if a query can be cached without the need to perform complex analysis on the query by examining the type and/or caller of the query. The cache suitability determination engine also determines if alternative cache policies should be applied to the query to cache the query, when additional analysis/modification of the query is needed before it can be cached. Thus, multiple query caching policies are used and applied to different types of queries to ensure an efficient mechanism that while ensuring privacy of data, operates to increase system efficiency and reduce latency. The query generation engine generates the query execution plan depending on the type of query caching policy applied. The cache policies include a cache only metadata, cache only data at a specific region and for a specific limited time period, and cache query plans by modifying the queries to remove constant expressions. Thus, the technical solution makes use of various cache policies for caching graph queries while ensuring data privacy and security obligations are met when caching graph query execution plans.

The technical solution described herein addresses the technical problem of inefficiency of current graph query execution plan generating mechanisms which involve generating a new query execution plan for new queries and addresses technical challenges involved with caching graph query execution plans due to privacy and security restrictions. The technical solution provides an efficient mechanism for ensuring compliance with privacy and security restrictions related to storage of sensitive data while caching graph query execution plans according to a multi-policy caching mechanism. The technical advantage includes improving the operation of computing systems used for generating graph query execution plans, improving memory usage and reducing latency in processing graph queries. The technical effects at least include (1) improving the operation of computing systems by reducing the amount of network traffic and computing processing power needed to execute queries in a graph data environment; (2) reducing the amount of time required to execute queries in a graph data environment; and (3) reducing the amount of memory required to store cache query execution plans and to execute queries in a graph data environment.

FIG. 1 illustrates an example system 100, upon which aspects of this disclosure may be implemented. The system 100 includes a query caller 102, graph query API 108, and query processing system 122. Additionally, the system 100 includes a graph data storage system 118. The query processing system 122 includes a cache suitability determination engine 110, query plan generating engine 114, query plan cache 112, and graph query execution engine 116. The graph data storage system 118 may include a plurality of data stores 120A-120N. Each of the data stores 120A-120N may be a separate physical or virtual data store rule. In some implementations, each data store 120A-120N stores a different type of data. The data stores 120A-120N may be located in the same geographical region or may be in completely different geographical regions (e.g., different countries or continents). The data stores 120A-120N are semantically connected to provide a cohesive data infrastructure that can be accessed for retrieving many the different types of data stored in the various data stores of the graph data storage system 118.

Different users and/or systems may access and use the data stored in the graph data storage system 118 by making queries to the graph data storage system 118. The different users and systems who make queries to the graph data storage system 118 are referred to in this disclosure as query callers or callers. The query caller 102 includes a client device 104 and service 106 from which a query to the graph data storage system 118 may be received. The client device 104 represents a client device used by a user to submit a query to the graph data storage system. In addition to individual users, many services or systems may make use of data stored in a graph data storage system. For example, copilots such as large language models (LLMs) or other generative artificial intelligence models often submit queries to the graph data storage system 118. Thus, service 106 represents any cloud service, copilot or other system that can function as a query caller by submitting a query for data to the graph data storage system 118. FIG. 1 depicts only one client device 104 and service 106 for simplicity. In practice, graph queries may be received from many different client devices and services. The internal hardware structure of a client device and/or a server used to submit a query or execute other elements of system 100 is discussed in greater detail in regard to FIGS. 5 and 6.

Queries are submitted to the graph data storage system 118 via the graph query API 108, which is where the input queries enter the system. The graph query API 108 is an API that allows the query caller 102 to interact with and issue queries to the graph data storage system 118. As discussed above, a graph data environment such as the graph data storage system 118 often receives numerous queries that need to be processed in any given time period. To decrease the processing resources and processing time required to process a received query, the system 100 makes use of a query plan cache 112 to cache and reuse queries. However, the graph data storage system 118 is required to ensure compliance with data privacy restrictions. As a result, query plans that may include sensitive data need to be examined and/or modified to remove any sensitive data and otherwise comply with data restriction rules, before the plans can be cached.

An example of rules governing data privacy is that while storage of system metadata is not restricted in most cases, storage of data that is considered confidential or private is often subject to more restrictive rules. Additionally, depending on the classification of data, different encryption requirements may apply. Furthermore, data may be subject to data retention/life-time requirements. For example, depending on the classification of data, the system may be allowed to temporally cache a specific type of data for short periods of time, while permanently storing that type of data may be prohibited. In an example, data at rest may require encryption, which means that the cache key for a given query plan may need to be encrypted. This results in a need for either incurring the cost of system complexity and computation overhead for encryption/decryption, applying shorter cache life cycles and/or avoiding certain types of storage. Still further, specific organization (e.g., customer) policies may govern data storage. Such policies could govern, for example, in which logical regions (e.g., geographical regions) storage is permitted and in which regions it is prohibited. For example, customer content can typically only be stored in the home region of the user. This means that if a caller residing in Europe issues a query that includes customer content to an instance of the graph query system hosted in North America, caching the query with the query string as the cache key, even if it is cryptographically hashed, could potentially violate regulations or organization policies.

Identifying privacy rules that apply to a given query and processing the query based on such rules is a complex and computationally resource intensive task. To reduce the complexity, the query processing system 122 applies constraints to the incoming queries in a manner that reduces system complication (at different levels), reduces computational and storage overhead and provides a high cache hit rate. This is achieved by utilizing the cache suitability determination engine 110.

The cache suitability determination engine 110 is responsible for making a determination as to whether a given query should be cached and if the query is going to be cached, how the query plan should be generated to safely cache the query. To ensure system efficiency and security, the cache suitability determination engine 110 makes use of multiple different cache policies to make these determinations. The different policies can be registered in the system, and the cache suitability determination engine 110 is responsible for executing the policies for incoming queries, as discussed in more details with regards to FIG. 2. The cache suitability determination engine 110 may execute received queries in sequence (according to some precedence) or in parallel, depending on configuration and/or available system resources.

The query plan generating engine 114 is responsible for generating a query plan for executing the query. The term "query plan" or "query execution plan" as used herein refers to a compiled query execution plan that provides information on how the received query should be executed in the graph data storage system 118. In some implementations, the query plan is an SQL server execution plan. In another implementation, the query plan includes instructions such as which Hypertext Transfer Protocol (HTTPs) calls to make. Depending on how the query is cached and which cache policy is applied, the query plan generating engine 114 may generate an execution plan that includes a query plan and an execution context. The query plan generating engine 114 may be a compiler that receives the query and generates the query plan as determined by the cache suitability determination engine 110. The query plan may be a read-only data structure that can be reused when cached. The execution context may be separate data structure that is only used for executing the query plan but is not cached. In this manner, data in a given query that is potentially sensitive is used to execute the query but is not stored as part of the cached query plan. In some implementations, the query plan generating engine 114 is combined with and/or operates together with the cache suitability determination engine 110 to generate the query plan in accordance with the appropriate policy identified by the cache suitability determination engine 110.

Depending on whether or not the cache suitability determination engine 110 identifies a given query as being suitable for caching, the query plan generated by the query plan generating engine 114 may be transmitted to the query plan cache 112 or the graph query execution engine 116 for immediate execution. When the cache suitability determination engine 110 has identified a query as being appropriate for caching, the generated query plan is transmitted to the query plan cache 112 for storage. The query plan cache 112 includes data structures and supporting code to handle storage of the compiled query execution plan in cache. In some implementation, the query plan cache 112 is hosted in memory on the query processing system 122 or in memory in the computing system that executes the query plan generating engine 114. However, storage of the cache in the computing system that executes the query plan generating engine 114 may result in storage overhead for duplicated query plans across query compilation servers, when a graph data storage system 118 makes use of multiple query processing systems or multiple query plan generating engines 114. To reduce memory overhead, in some implementations, the query plan cache is hosted in a shared storage medium such as a Distributed Hash Table (DHT) (e.g., Redis) or Network Attached Storage. A shared storage solution allows for sharing data more efficiently, avoiding both storage overhead and unnecessary computation. However, caching in local memory typically results in faster retrieval of a query plan than retrieval of the query plan from a shared storage service. Selection of local or shared memory for storage of the cached query plan may depend on constraints such as available system memory and processing resource, as well as acceptable plan retrieval latency. In an implementation, the query plan cache 112 is implemented in a SQL server using a hash function for generating keys. The hash function, which may be a known algorithm, may be applied to the query input.

In some implementations, cached query plans are identified by a unique name which may be referred to as the query plan cache key. The query plan cache key contains the data that affects how the query plan is generated and could cause the query plan generating engine 114 to generate a different query plan. Generation of the cache key may be done in a number of different manners but requires that a difference in query text or context produces a unique cache key. In some implementations, this is achieved by combining the query text and a hash of the relevant parts of the query context to generate the cache key. Query context could include information about geographical regions and various other settings. The query plan cache key is then used to perform a cache lookup/and or cache insertion, as discussed in more details below. The query plan cache key may be generated by the query plan generating engine 114, after a determination has been made by the cache suitability determination engine 110 that a query can be cached.

In some implementations, a query received by the query processing system 122 is first used to perform a query lookup against the query plan cache 112 to determine if the query matches a cached query plan. When a match is identified, the query processing system 122 simply uses the cached query plan to execute the query. However, when a match is not found, the query processing system 122 utilizes the cache suitability determination engine 110 to determine if the query should be cached for future reuse.

A cache management policy is applied to the query plan cache 112 to manage lifetime of cached query plans and/or the state of the cache. In an example, a First-In, First-Out (FIFO), Last-In, First-Out policy/LIFO, or any other desirable policy is applied to determine which cache entries should be evicted in situations where maximum cache size has been reached. In addition, per entry time to live (TTL) can be leveraged to control expiry of cached query plans. Once a query has been cached in the query plan cache 112 or when a determination has been made that the query cannot be cached, the query execution plan is transmitted to the graph query execution engine 116, which is responsible for executing the query plan in the graph data storage system 118 to retrieve query results. In some implementations, a generated query plan is transmitted to the query plan cache 112 for caching and the graph query execution engine 116 for execution simultaneously. Furthermore, when a received query is identified as being already available in the query plan cache 112, the identified query plan is retrieved from the query plan cache 112 and transmitted to the graph query execution engine 116 for execution.

Various elements of the system 100 are connected to each other via a network (not shown). The network may be one or more wired or wireless networks or a combination of wired and wireless networks. The system 100 may be implemented in a single site or spread out in a number of facilities or geographically separated locations. The graph query execution engine 116 may be a separate service and may be in a separate physical location than the remaining elements of the query processing system 122. In an example, the graph query execution engine 116 is part of the graph data storage system 118.

Figure 2:
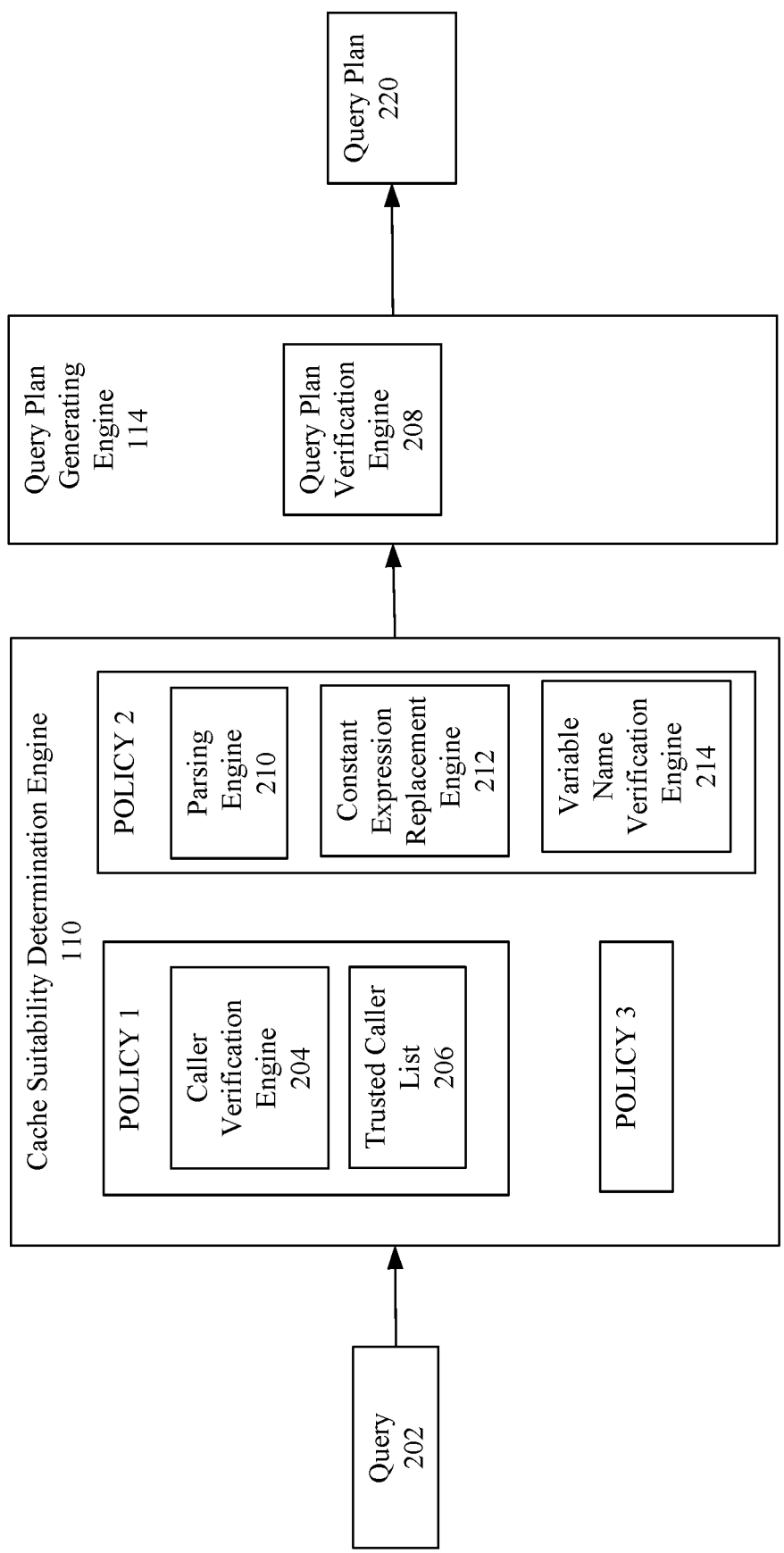
FIG. 2 is an example of data flow between some elements illustrated in and other elements used by the system illustrated in FIG. 1.

FIG. 2 is an example of data flow between some elements illustrated in and other elements used by the system illustrated in FIG. 1. A query 202 received by the query processing system for which a cached query plan is not found, is transmitted to the cache suitability determination engine 110 to determine the query's suitability for caching and to identify the appropriate caching policy for the query. The cache suitability determination engine 110 makes use of multiple policies such as policy 1, policy 2 and policy 3 to provide an efficient and yet privacy-preserving mechanism for caching graph queries.

Policy 1 is applied to queries that are issued by trusted query callers. That is because in a graph data storage system, there are often repeated query callers that are experienced, have been trained and/or can otherwise be trusted to provide queries that do not contain private data. These callers are referred to herein as "trusted callers" or "allowed callers" and are query providers that can be trusted to provide trustable query inputs. Trustable query inputs are queries that can be cached without the need to make changes to the query language and still not violate any privacy rules and regulations. These query callers may be individual users or maybe services that are trusted for providing non-private data. For example, services that are known to only include metadata in their queries may be identified as trusted caller. The determination of which callers are trusted callers may be made on a case-by-case basis and may be a manual process. Callers that are identified as trusted callers are added to a trusted caller list 206 which is used by the caller verification engine 204 to determine if policy 1 can be applied to the query 202. Thus, when the query 202 is received, the cache suitability determination engine 110 utilizes the caller verification engine 204 to compare an identification of the query caller to the trusted caller list 206 and determine if the query caller matches with a caller in the trusted caller list 206. When a match is found, policy 1 is likely applicable to the query 202. This provides a quick and computationally light mechanism for determining that the query 202 can be cached.

While utilizing the trusted caller list 206 increases efficiency and provides an assurance that no sensitive information is likely part of the query text. This could be considered risky as an error by the caller may result in violating regulations. To improve resilience, some implementations make use of a query plan verification engine 208 to verify compliance. After the cache suitability determination engine 110 determines that policy 1 can be applied to query 202 to cache the query, the query plan generating engine 114 generates the query plan 220 using the query language. Once the query plan 220 is generated, the query plan verification engine 208 examines each element of the plan to ensure that the query plan does not include any potentially private data, before it is submitted for caching. This is done by examining the query plan 220 to identify any data that is not allowed (e.g., free-text or constant values). This means that the query plan verification engine 208 examines the query plan 220 to ensure each data point in the query plan 220 is one of a known set of allowed expression types that a query plan can be made up of. Thus, the query plan verification engine 208 goes through the expression tree of the query and verifies that there are no constants in the query that have not been provided as arguments. A simplified example of a query plan verification engine 208 is provided in the pseudo code below:

```
switch (expression-type){
    case allowedExpression1:
    case allowedExpression2:
        // Visit sub-expressions
    case disallowedExpression1:
    case disallowedExpression2:
        return false;
    default:
        // Produce developer error
        return false;
}
```

When the query plan verification engine 208 encounters an allowed expression, it will continue to examine all sub-expressions. If the query plan verification engine 208 encounters any prohibited expressions, it will identify the query as not being suitable for caching using Policy 1. In such cases, the cache suitability determination engine may proceed to determine whether the query can be cached under policy 2 or policy 3 or may simply identify the query as not being suitable for caching. In some implementations, there is a configuration setting for selecting which route to take when the query is identified as not being suitable for caching using Policy 1. The configuration setting can be a setting that can be turned on and off at run time to enable a developer to select which route to take in a given data environment.

It should be noted that in a software development ecosystem that is in constant change, numerous software developers from various teams contribute to code. As a result, new query plan expressions may be added regularly. To ensure safety in such an environment, the query plan verification engine 208 will disallow caching if any unknown expression type is encountered. In some implementations, to improve developer agility, automated checks for any missing or unknown query plan expressions are executed. When unknown query plan expressions are encountered, notifications may be provided to developers to remind them to add the new expressions to the list of allowed expressions.

While policy 1 provides the advantage of simplicity and efficiency in processing graph queries, the complexity is shifted to the query caller who is required to provide only metadata in their queries and/or to provide constants as parameters. In addition, policy 1 does not solve all problems related to sensitive data in query strings. Specifically, it does not cover query variables, and as such it is only suitable for trusted workloads where the query is formatted in a way that does not divulge any sensitive data through variable names. The issue of sensitive variables is illustrated in the below listing, which shows two formulations of an equivalent query, where the first one cannot be cached using policy 1, but the second one can be cached using Policy 1. That is because the first query includes the sensitive name, Alice, while the second query replaces the sensitive name with a non-sensitive variable name.

MATCH (Alice)-[:MODIFIED]→(doc:Document) WHERE Alice.Id=$arg1

MATCH (user)-[:MODIFIED]→(doc: Document) WHERE user.Id=$arg1

An example of queries that can potentially include sensitive variable names is queries received from copilots such as LLMs. While some LLMs can be trusted callers, others may not have the capability to guarantee that non-sensitive variable names are used. Furthermore, it is desirable to provide caching services that are easy to reason over and interact with for LLMs. As such, it may not be desirable to pass the burden of providing constants as parameters and not including variable names in queries to LLMs. As such, queries submitted by some LLMs may not be processable under policy 1. To cover these types of LLMs and any other non-trustable callers, the cache suitability determination engine 110 makes use of policy 2.

Policy 2 enables caching of queries that contain constant expressions and/or sensitive variable names. This can be achieved by parsing the input query string and transforming it, when needed, to a variant in which constants are passed as parameters and variable names are non-sensitive. The transformed output can then be safely used to generate a cache key that will allow the system to re-use previously compiled query execution plans the same way as in policy 1. It should be noted that although policy 2 is more flexible than policy 1, policy 1 is preferable to use. That is because the e pre-processing required for policy 2 is more computationally expensive and thus less efficient.

As a result, when policy 1 is not available for a query (e.g., either because the caller is not trustable or because it did not pass verification), the cache suitability determination engine 110 determines if policy 2 should be applied. This involves first using a parsing engine 210 to parse the query 202 and generate an intermediate format for the query. It should be noted that while the parsing engine 210 is displayed as being part of the cache suitability determination engine 110, the parsing engine 210 may be located in the query plan generating engine 114 since the query plan generating engine 114 also makes use of a parsing engine to generate the query plan.

In the intermediate format generated by the parsing engine 210, constant values are wrapped in a constant expression. A constant expression replacement engine 212 is then used to examine all query plan expressions in the intermediate format to identify expressions that are constant expressions. When a constant expression is encountered, the constant expression replacement engine 212 replaces the constant expression with a parameter expression with some deterministic generic parameter name. In an example, the first encountered constant expression is replaced by a parameter $arg1, the second constant replaced by a parameter $arg2 and so on. This ensures that the parameter names used are deterministic so that the parameters appear in the same order to the constant expression replacement engine 212 and the query plan execution engine. The constant value that is replaced is added to a query parameter list, associated with this new parameter name. These parameter names are deterministic so that they are the same for all queries that follow the same pattern. This ensures that the constants can be injected into the query plans when they are executed in the correct order. Moreover, generating parameter names according to a generic input-independent pattern provides the added advantage of removing the possibility of leaking sensitive data through the use of a hash function. The new returned intermediate format is interchangeable with how it would normally look had the original query been parameterized by the caller.

In some implementations, the graph query execution system relies on a query language for authoring queries which gives rise to a number of situations in which the intermediate format may contain sensitive data in the form of variable names. Some examples are aliases and property bags. Thus, in addition to examining the query for constant expressions, it is important to check for variable names that may contain sensitive data. This is achieved by utilizing the variable name verification engine 214, which examines each expression in the intermediate query format to identify variable names that could contain sensitive data. When a potentially sensitive variable name is encountered, the variable name verification engine 214 replaces the sensitive variable name with a generic name. A simplified example of a variable name verification engine 214 that replaces a sensitive variable name with a generic name is provided in the pseudo code below:

WITH "username" AS sensitiveUserName
    RETURN {sensitive VariableName: sensitive User-
       Name}
    ---replacement--->
    WITH $arg1 as $alias1
    RETURN {$var1: $alias1}
    ---reinstation--->
    WITH "username" AS sensitiveUserName
    RETURN {sensitiveVariableName: sensitiveUserName This replaces free-text variable names with a generic and predictable pattern, for example "var1". In an example, MATCH (alice) and MATCH (user) are transformed into the same output, thus making the overlapping patterns go to the same cache entry. A failure to achieve this would yield duplicate cache entries for the same query pattern, which results in inefficient memory use and a reduced cache hit rate. One challenge with this approach is that the caller could potentially be reliant on the variable names in the return statement, thus making this substitution troublesome. For example, if the caller is expecting to get a JSON object with the name sensitiveUserName in the response and the system instead returns a JSON object with the name var1, this results in an unsuccessful query response. To address this issue, return value variables are reinstated into the result before returning the results to the caller. This can occur at different points during the query processing process, depending on the required implementation and system. For example, having the query executed with the generated generic variable names ensures smaller payload sizes, which results in inserting potentially long user-provided variable names when preparing the final result shape, and thus increasing efficiency.

The original variable name and/or constant expression is stored in a data structure that is separate from the query plan 220 and transmitted with the query plan for execution to the graph query execution engine. The graph query execution engine and/or query plan generating engine 114 replaces the parameter and/or generic variable with the original constant expression or variable name in the query plan before the query plan is executed. This involves inserting user provided data into the query plan at the appropriate locations. As an example, in the example query plan below, the parameter $arg would be replaced by an actual user provided id before the query plan is executed.

NodeById[$0, ids:$arg, Properties: (ObjectId)]
Parameter injection is often the last step performed before the query plan is returned for execution.

In some implementations, in addition to policy 1 and policy 2, a policy 3 is also utilized by the cache suitability determination engine 110. In particular instances where policy 1 does not apply or where a reduction in computing resources needed to apply policy 1 or policy 2 is desired, a configuration setting may be used to apply policy 3. Policy 3 may involve caching query plans that may include sensitive data but ensuring that the cached plans are stored in a specific region and/or are cached for a specific limited time period (e.g., less than 24 hours). That is because some privacy rules are region-specific rules which dictate that data transfer and/or storage outside of a region is not permitted or that data that is stored for a long time period has to comply with privacy regulations. The cache suitability determination engine 110 may determine that a query plan can be cached even if it include sensitive data, if the query plan is stored within a given geographic location and/or for a limited time period. This can provide the desired benefits of caching queries without violating privacy regulations, while reducing the computational resources needed to apply policy 1 and/or policy 2.

Figure 3:
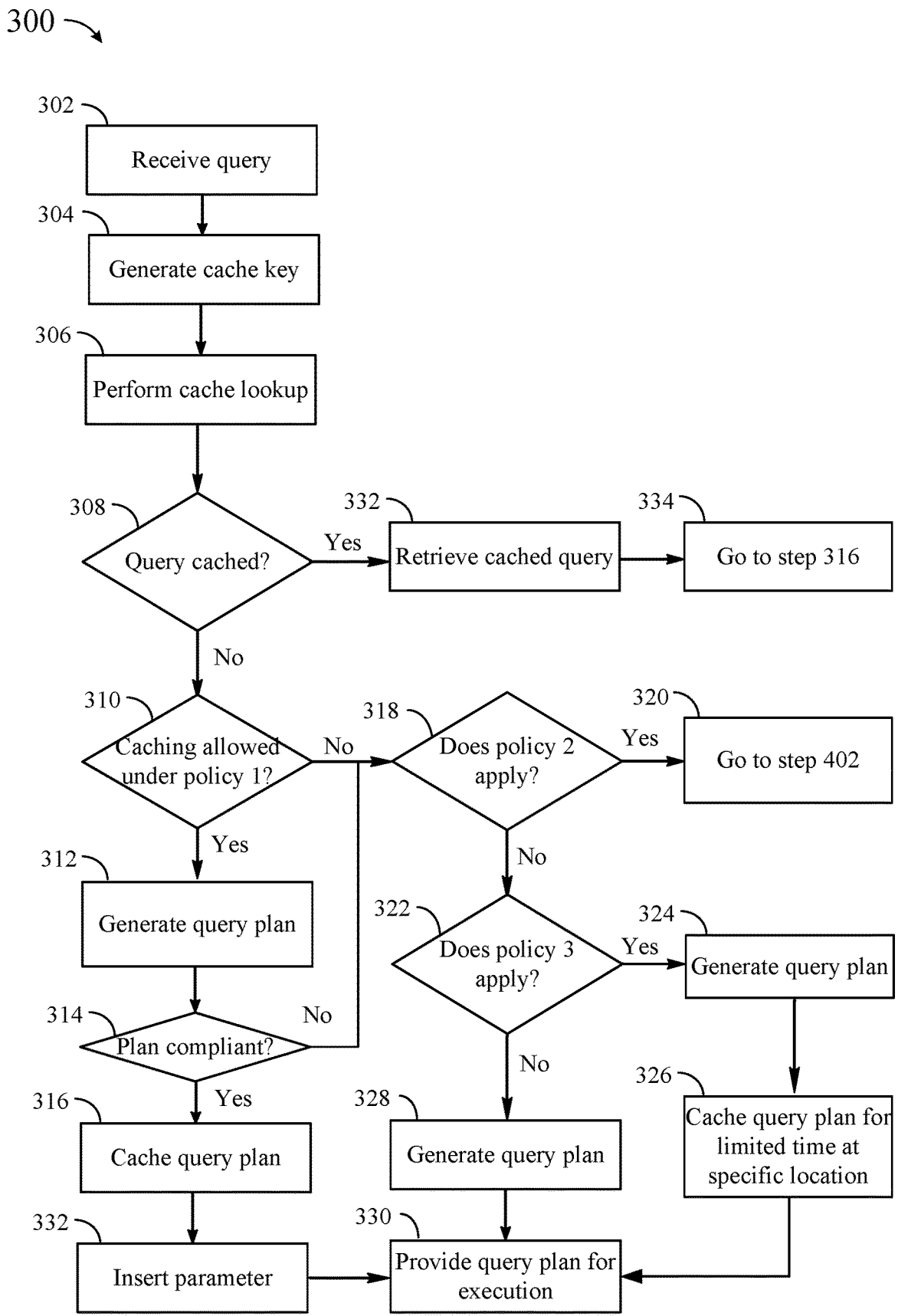
FIG. 3 is a flow diagram showing an example method for caching a query submitted to a graph data environment in a privacy-preserving manner.

FIG. 3 is a flow diagram showing an example method for caching a query submitted to a graph data environment in a privacy-preserving manner. In an example, one or more steps of method 300 are performed by a query processing system such as the query processing system 122 of FIG. 1.

Method 300 begins by receiving a query, at 302. The query is received from a query caller, which may be a client device of an individual user or a server that runs a service. The query is received via a graph API and transmitted to the query processing system for processing. After receiving the query, method 300 proceeds to generate a query plan cache key for the query, at 304. This may be done via known mechanisms of generating a query cache key, as discussed above. Once the query plan cache key is generated, it is used to perform a cache lookup, at 306. This involves comparing the generated cache key to cache keys in a query plan cache to determine if the received query has already been cached. Thus, at 308, method 300 determines if the query was previously cached.

When it is determined that the query was previously cached and as such a cached query plan is available for the query, method 300 proceeds to retrieve the cached query plan, at 332, before moving to step 334. In this manner, a query that has already been cached can avoid having to go through various processing steps that require memory and processing resources and take additional time. Instead, the query can be quickly executed, thus saving computing resources and reducing latency.

When no matching cached query plan is identified, at 308, method 300 proceeds to determine if the query is suitable for caching under a first graph query caching policy, at 310. This may involve examining an identification for the query caller who submitted the query to determine if the identification is on a list of trustable callers. Additionally or alternatively, the process may involve examining a context associated with the query to determine if the context matches a known allowed caching scenario. This may involve examining other parameters associated with the query such as the application from which it was issued, the time at which it was issued, the type of data it is requesting and the like and determine if one or more of the parameters indicate an allowed caching scenario. If it is determined that caching under the first graph query caching policy is not suitable for the query (e.g., the caller is not on the allowed list and/or the context is not on the allowed scenario list), method 300 proceeds to determine if the query is suitable for caching under a second graph query caching policy, at 318. This may depend on configuration settings or may involve determining if any other caching policies for caching the query are available. When it is determined that the query is suitable for caching under the second graph query caching policy, method 300 proceeds to step 402, at 320.

When it is determined, however, that caching is not suitable for the query under the second graph query caching policy, method 300 proceeds to step 322 to determine if a third graph query caching policy applies to the query. The third graph query caching policy may apply to queries that can be cached in a local allowed geographical location and/or for a limited time period (e.g., 24 hours). This policy ensures that queries that cannot be otherwise cached are cached while still complying with data privacy rules and regulations. Thus, when it is determined that the third graph query caching policy applies to the query, at 322, method 300 proceeds to generate a query plan for the query, at 324, before caching the query plan for a limited time at a specific allowed geographical location. After caching the query plan, method 300 proceeds to provide the query plan for execution, at 330. If it is determined, at step 322, that the third graph query caching policy also does not apply to the query, then method 300 proceeds to generate the query plan, at 328 and proceeds to provide the query plan for execution, at 330, without caching the query. That is because, at this stage, it has been determined that none of the available graph query caching policies apply to the query. As a result, the query is simply processed without caching.

When it is determined, at step 310, that caching under the first caching policy is suitable for the query, method 300 proceeds to generate a query execution plan for the query, at 312. After generating the query execution plan, method 300 proceeds to verify if the generated query plan is compliant with the first graph query caching policy. This involves using a query plan verification engine to examine the query plan to verify if there are any unknown expression or prohibited expressions in the query plan. An unknown expression presents a risk of the expression including sensitive data and prohibited expressions are those that are known to include sensitive data. As a result, if the query plan includes any such expressions, it should not be cached under the first graph query caching policy. Thus, when it is determined that the query plan includes such an expression, method 300 stops processing the query under the first graph query caching policy and proceeds to step 318 to determine if the second graph query caching policy is suitable for the query.

When method 300 verifies that the query plan is compliant with the first graph query caching policy, the method proceeds to cache the query plan, at 316. Next, the query plan is examined to determine if there are any expressions that need to be replaced in the query plan before the query plan is executed. This occurs, for example, when the query caller provides constant expressions separately from the query to ensure private data is not included in the query. Any expressions that are not allowed to be in a query (if the query is being cached), may be transmitted separately and stored in a separate data structure from the query. At this point, such expressions are inserted into the query plan, at 332, to ensure that the query plan contains the required data for processing the query. The query plan is then provided for execution, at 330.

Figure 4:
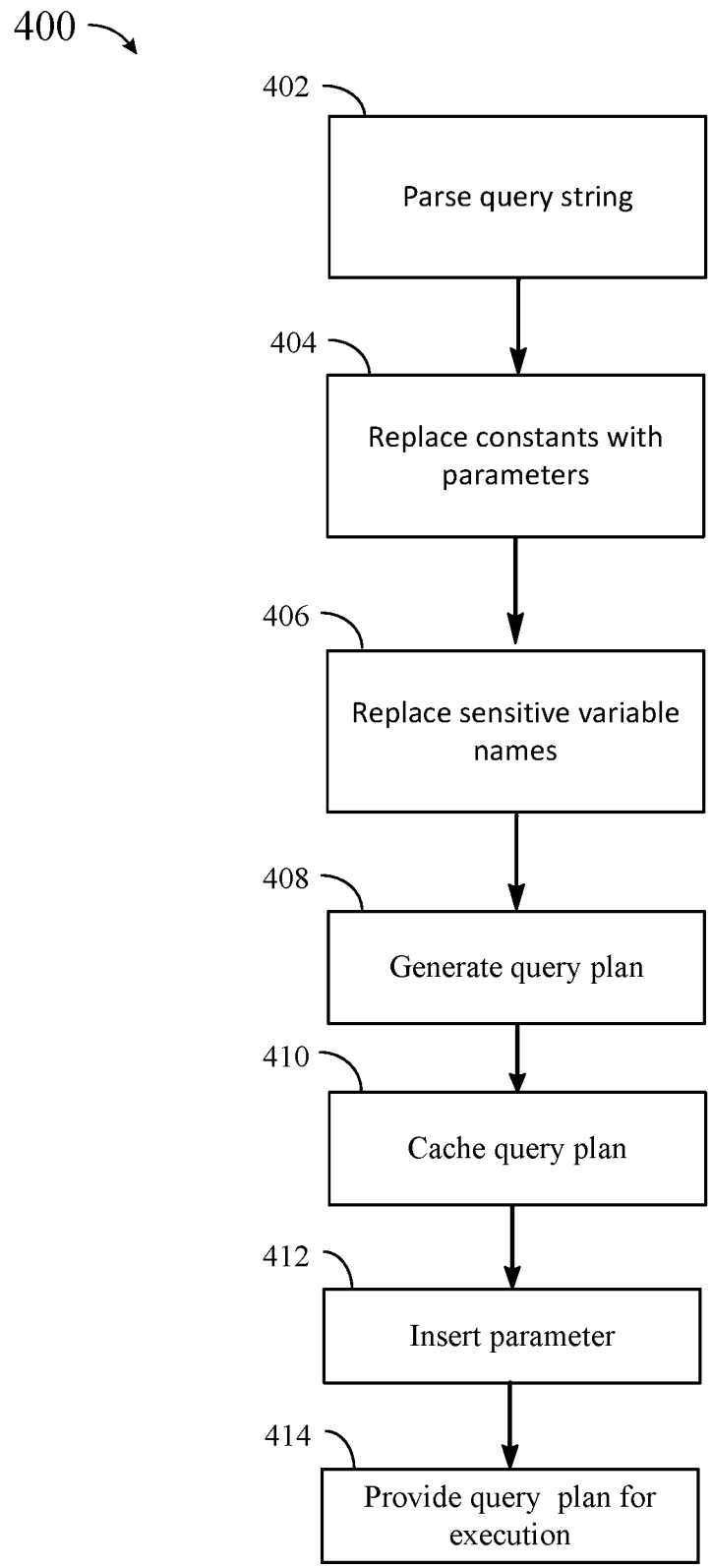
FIG. 4 is a flow diagram showing an example method for caching a query execution plan according to a second query caching policy.

FIG. 4 is a flow diagram showing an example method for caching a query execution plan according to a second query caching policy. When it is determined, at step 318 of method 300 or when a query is received, that the received query is suitable for caching under the second graph query caching policy, method 400 begins by parsing the query string, at 402, to generate an intermediate format for the query. The intermediate format is then examined with a constant expression replacement engine to determine if the query contains any constant expressions. When a constant expression is identified in the intermediate format of the query, method 400 proceeds to replace the constant expression with a parameter, at 404. The process then proceeds to examine the intermediate format to determine if the query includes any sensitive variable names. When a sensitive variable name is identified in the intermediate format of the query, method 400 proceeds to replace the constant expression with a non-sensitive variable name, at 406.

Once all constant expressions and sensitive variable names have been replaced with parameters and non-sensitive data, method 400 proceeds to generate a query plan for the query, at 408. The query plan is then cached, at 410, since no sensitive or risky data is now present in the query plan. The replaced constant expressions and sensitive variable names are stored in a separate data structure and used, at 412, to insert the original parameters into the query plan, before the query plan is provided for execution, at 414.

Figure 5:
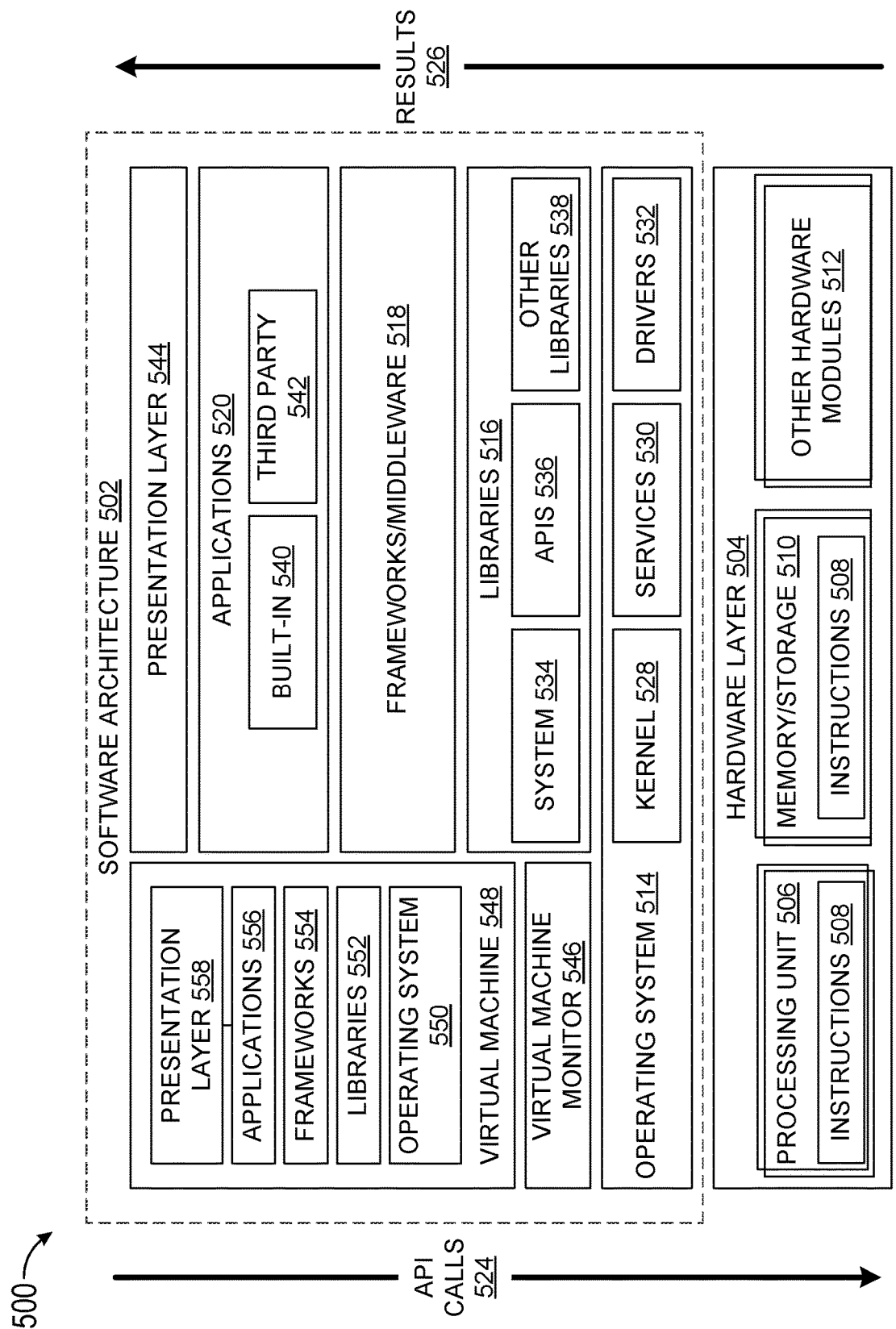
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture, and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 506 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 544. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various graphic user interface (GUI) functions, high-level resource management, or high-level location services. The frameworks 518 may provide a broad spectrum of other APIs for applications 520 and/or other software modules.

The applications 520 include built-in applications 540 and/or third-party applications 542. Examples of built-in applications 540 may include, but are not limited to, a contacts application, a browser application, a location application, a media application, a messaging application, and/or a game application. Third-party applications 542 may include any applications developed by an entity other than the vendor of the particular system. The applications 520 may use functions available via OS 514, libraries 516, frameworks 518, and presentation layer 544 to create user interfaces to interact with users.

Some software architectures use virtual machines, as illustrated by a virtual machine 548. The virtual machine 548 provides an execution environment where applications/modules can execute as if they were executing on a hardware machine (such as the machine depicted in block diagram 600 of FIG. 6, for example). The virtual machine 548 may be hosted by a host OS (for example, OS 514) or hypervisor, and may have a virtual machine monitor 546 which manages operation of the virtual machine 548 and interoperation with the host operating system. A software architecture, which may be different from software architecture 502 outside of the virtual machine, executes within the virtual machine 548 such as an OS 550, libraries 552, frameworks 554, applications 556, and/or a presentation layer 558.

Figure 6:
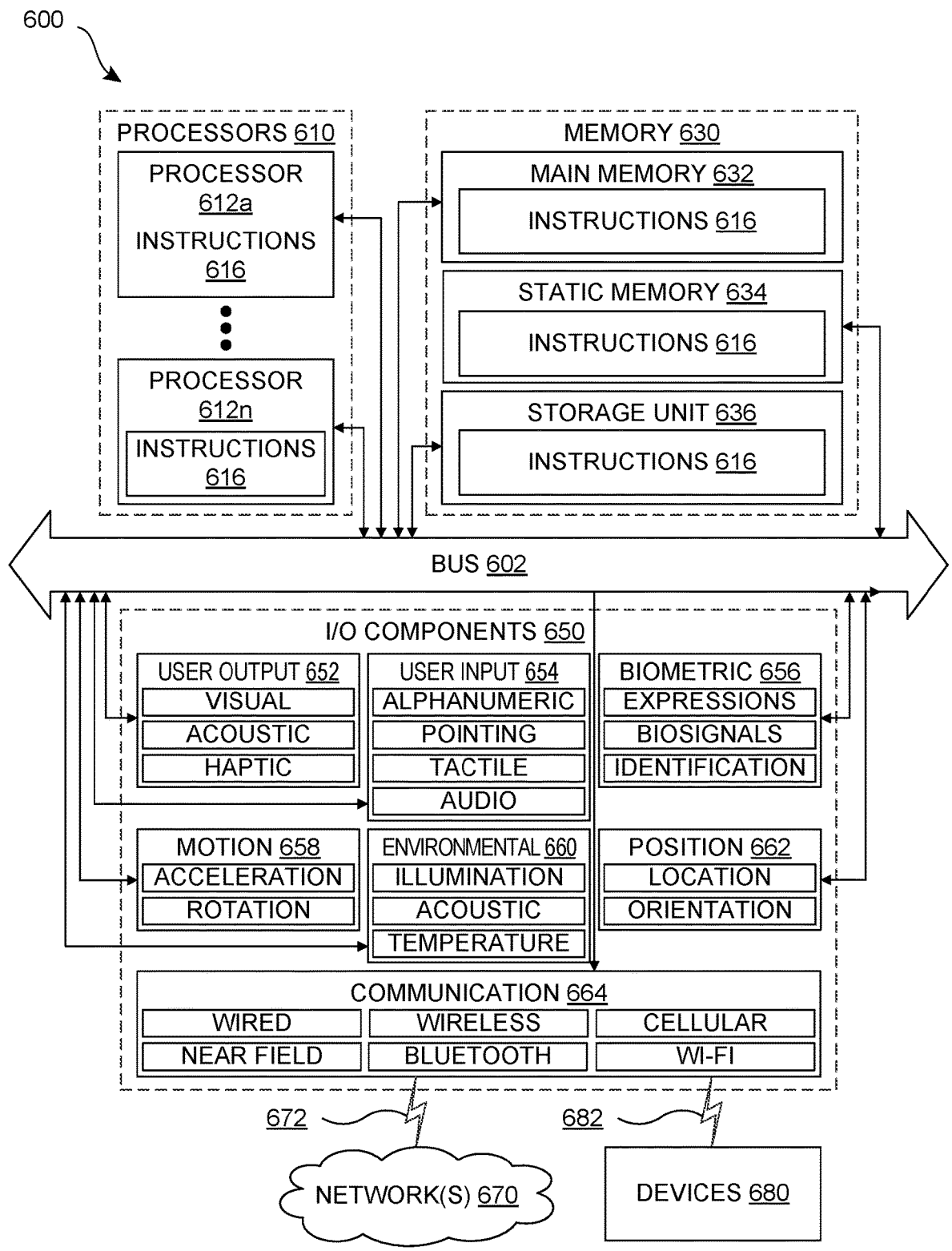
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines. In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656, motion components 658, environmental components 660 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers). The motion components 658 may include, for example, motion sensors such as acceleration and rotation sensors. The environmental components 660 may include, for example, illumination sensors, acoustic sensors and/or temperature sensors.

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 664, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

In the foregoing detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

Generally, functions described herein (for example, the features illustrated in FIGS. 1-5) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor alone or in combination with other processors, cause the data processing system to perform functions of:
receiving a query from a client device for data stored in a graph data storage system, the query being received from a query caller via an application programming interface;
upon receiving the query, generating a query plan key cache from the query;
performing a query cache lookup for the query in the query plan key cache to determine whether the query had previously been cached;
upon determining that the query had previously been cached, retrieving a cached query execution plan for the query from the query plan key cache and providing the cached query execution plan for execution;
upon determining that the query had not previously been cached, determining, via a cache suitability determination engine, that the query is suitable for caching under a first graph query caching policy based on at least one of the query caller being a trusted caller or a query scenario being a trusted query scenario;
upon determining that the query is suitable for caching under the first graph query caching policy, generating a query execution plan for the query via a graph query plan generating engine;
examining the query execution plan to verify that the query is suitable for caching under the first graph query caching policy;
upon verifying that the query is suitable for caching under the first graph query caching policy, caching the query execution plan;
upon verifying that the query is not suitable for caching under the first graph query caching policy, caching the query under a second graph query caching policy; and
providing the query execution plan for execution.

2. The data processing system of claim 1, wherein caching the query under the second graph query caching policy includes:
parsing the query to identify a plurality of expressions in the query;
examining each of the plurality of expressions to identify one or more constant expressions in the query;
replacing each of the one or more constant expressions with a parameter in the query;
examining each of the plurality of expressions to identify one or more sensitive variable names in the plurality of expressions;
replacing each of the one or more sensitive variable names with a generic variable name in the query; and
caching the query with a replaced parameter and a replaced generic variable name.

3. The data processing system of claim 1, wherein verifying that the query is suitable for caching under the first graph query caching policy includes:
examining the query execution plan via a query plan verification engine to determine if the query execution plan includes at least one of an unknown expression or a prohibited expression; and
upon identifying the unknown expression or prohibit expression, identifying the query as being unsuitable for caching under the first graph query caching policy.

4. The data processing system of claim 1, wherein before providing the query execution plan for execution, the query execution plan is examined to determine if at least one of a parameter in the query execution plan needs to be replaced with a constant or a generic variable name in the query execution plan needs to be replaced with a sensitive variable name and replacing the at least one of the parameter with the constant or the generic variable name with the sensitive variable name in the query execution plan.

5. The data processing system of claim 1, wherein determining that the query is suitable for caching under the first graph query caching policy includes determining that an identification associated with the query caller is on a trusted caller list or that a context associated with the query is on a list of trusted query scenarios.

6. The data processing system of claim 5, wherein determining that an identification associated with the query caller is on a trusted caller list is done via a caller verification engine.

7. A method for caching a query submitted to a graph data storage system, comprising:
receiving a query from a client device directed to the graph data storage system, the query being received from a query caller via an application programming interface;
upon receiving the query, generating a query plan key cache from the query;
performing a query cache lookup for the query in the query plan key cache to determine whether the query had previously been cached;
upon determining that the query had previously been cached, retrieving a cached query execution plan for the query from the query plan key cache and providing the cached query execution plan for execution;
upon determining that the query had not previously been cached, examining the query, via a cache suitability determination engine, to determine if the query is suitable for caching under a first graph query caching policy based on at least one of the query caller being a trusted caller or a query scenario being a trusted query scenario;

upon determining that the query is suitable for caching under the first graph query caching policy, generating a query execution plan for the query via a graph query plan generating engine;

examining the query execution plan to determine if the query execution plan is suitable for caching under the first graph query caching policy;

upon determining that the query execution plan is not suitable for caching under the first graph query caching policy, caching the query under a second graph query caching policy; and providing the query execution plan for execution.

8. The method of claim 7, wherein caching the query under the second graph query caching policy includes:

parsing the query to generate an intermediate format for the query, the intermediate format including a plurality of expressions;

examining each of the plurality of expressions to identify one or more constant expressions in the query;

replacing each of the one or more constant expressions with a parameter in the query;

examining each of the plurality of expressions to identify one or more sensitive variable names in the plurality of expressions;

replacing each of the one or more sensitive variable names with a generic variable name in the query; and caching the query with a replaced parameter and a replaced generic variable name.

9. The method of claim 7, wherein determining if the query is suitable for caching under the first graph query caching policy includes:

examining the query execution plan, via a query plan verification engine, to determine if the query execution plan includes at least one of an unknown expression or a prohibited expression; and upon identifying the unknown expression or prohibit expression, identifying the query as being unsuitable for caching under the first graph query caching policy.

10. The method of claim 7, wherein before providing the query execution plan for execution, the query execution plan is examined to determine if at least one of a parameter in the query execution plan needs to be replaced with a constant or a generic variable name in the query execution plan needs to be replaced with a sensitive variable name and replacing the at least one of the parameter with the constant or the generic variable name with the sensitive variable name in the query execution plan.

11. The method of claim 7, wherein determining if the query is suitable for caching under the first graph query caching policy includes determining that an identification associated with the query caller is on a trusted caller list or that a context associated with the query is on a list of trusted query scenarios.

12. The method of claim 11, wherein determining that an identification associated with the query caller is on a trusted caller list is done via a caller verification engine.

13. A non-transitory computer readable medium on which are stored instructions that when executed cause a programmable device to perform functions of:

receiving a query from a client device directed to a graph data storage system, the query being received from a query caller via an application programming interface;

upon receiving the query, generating a query plan key cache from the query;

performing a query cache lookup for the query in the query plan key cache to determine whether the query had previously been cached;

upon determining that the query had previously been cached, retrieving a cached query execution plan for the query from the query plan key cache and providing the cached query execution plan for execution;

upon determining that the query had not previously been cached, examining the query, via a cache suitability determination engine, to determine if the query is suitable for caching under a first graph query caching policy based on at least one of the query caller being a trusted caller or a query scenario being a trusted query scenario;

upon determining that the query is not suitable for caching under the first graph query caching policy, determining if the query is suitable for caching under a second graph query caching policy;

upon determining that the query is not suitable for caching under the second graph query caching policy, determining if the query is suitable for caching under a third graph query caching policy, the third graph query caching policy being based on geographic location of a memory system on which a query execution plan for the query is stored and a limitation on an amount of time for which the query execution plan is stored;

upon determining that the query execution plan is suitable for caching under the third graph query caching policy, generating a query execution plan for the query via a graph query plan generating engine;

caching the query execution plan in the memory system for an allowed amount of time; and providing the query execution plan for execution.

14. The non-transitory computer readable medium of claim 13, wherein determining if the query is suitable for caching under the first graph query caching policy includes:

examining the query execution plan, via a query plan verification engine, to determine if the query execution plan includes at least one of an unknown expression or a prohibited expression; and upon identifying the unknown expression or prohibit expression, identifying the query as being unsuitable for caching under the first graph query caching policy.

15. The non-transitory computer readable medium of claim 13, wherein determining that the query is suitable for caching under the first graph query caching policy includes determining that an identification associated with the query caller is on a trusted caller list or that a context associated with the query is on a list of trusted query scenarios.

16. The non-transitory computer readable medium of claim 13, wherein determining that an identification associated with the query caller is on a trusted caller list is done via a caller verification engine.

* * * * *